United States Patent
Peng et al.

(10) Patent No.: US 7,095,562 B1
(45) Date of Patent: Aug. 22, 2006

(54) ADVANCED COMPACT HEAD UP DISPLAY

(75) Inventors: Guolin Peng, Cedar Rapids, IA (US); Martin J. Steffensmeier, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/197,006

(22) Filed: Aug. 4, 2005

Related U.S. Application Data (63) Continuation-in-part of application No. 10/951,295, filed on Sep. 27, 2004.

(51) Int. Cl.
- G02B 27/44 (2006.01)
- G02B 26/00 (2006.01)
- G09G 5/00 (2006.01)
- F21S 8/10 (2006.01)

(52) U.S. Cl. .............. 359/630; 359/631; 359/634; 359/290; 345/7; 345/8; 362/545

(58) Field of Classification Search ........ 359/630, 359/631, 634, 636, 290–292, 629; 345/7–9; 362/545

See application file for complete search history.

(56) References Cited

U.S. PATENT DOCUMENTS

| | | | |
|---|---|---|---|
| 4,218,111 A | 8/1980 | Withrington | |
| 4,900,133 A | 2/1990 | Berman | |
| 4,968,117 A | 11/1990 | Chern | |
| 5,436,763 A | 7/1995 | Chen | |
| 5,808,800 A * | 9/1998 | Handschy et al. | 359/630 |
| 5,907,416 A | 5/1999 | Hegg | |
| 6,088,165 A | 7/2000 | Janeczko | |
| 6,236,511 B1 | 5/2001 | Brown | |
| 6,327,806 B1 * | 12/2001 | Paige | 42/113 |
| 6,567,014 B1 | 5/2003 | Hansen | |
| 6,731,252 B1 * | 5/2004 | Sugiyama et al. | 345/6 |
| 6,789,901 B1 * | 9/2004 | Kormos | 353/13 |
| 6,801,362 B1 | 10/2004 | Brown | |
| 2005/0024749 A1 | 2/2005 | Nanba | |

OTHER PUBLICATIONS

Organic LED Displays (OLEDs)—the Next Trend? Audioholics. com Online A/V Magazine, Apr. 17, 2005, pp. 1-4.

* cited by examiner

Primary Examiner—Loha Ben
Assistant Examiner—Jack Dinh
(74) Attorney, Agent, or Firm—Nathan O. Jensen; Kyle Eppele (57) ABSTRACT

A head up display system for a vehicle that includes a compact image source for projecting an image. The compact image source may be foldable up toward or into a cockpit ceiling of the vehicle, be positioned within a dashboard of the vehicle, or located at another suitable position. A combiner reflects the projected image with optical power toward an observer for observation. The combiner is positioned so that the observer, in a line of sight, may see a visual exterior view of an outside scene through the combiner and the projected image in the combiner. In a preferred embodiment, the image source includes an illumination system that includes a high power light emitting diode (LED) array assembly. A Fresnel lens array is operatively associated with the LED array assembly for receiving light produced by the LED and providing a nearly collimated light output. A spatial light modulator receives the nearly collimated light output. The preferred combiner is a meniscus combiner that includes a meniscus lens; a multi-layer dichroic coating formed on a first surface of the meniscus lens; and, an anti-reflection coating formed on a second, opposite surface of the meniscus lens. The meniscus combiner preferably utilizes a non-symmetric aspheric meniscus lens.

17 Claims, 9 Drawing Sheets

ADVANCED COMPACT HEAD UP DISPLAY

CROSS REFERENCE TO RELATED APPLICATION

This is a continuation-in-part of U.S. Ser. No. 10/951,295, entitled "Compact Head Up Display With Wide Viewing Angle", filed Sep. 27, 2004.

BACKGROUND OF THE INVENTION

1. Field of the Invention

The present invention generally relates to the field of display systems, particularly to a method and optical display system for producing images and presenting the images for observation in combination with an observer's visual exterior view of an outside scene.

2. Description of the Related Art

A Head Up Display (HUD) is a means of projecting information directly into a human's visual field. The HUD was pioneered for military aviation and has since been used in other applications. HUDs are typically used in aircraft to provide pilots with information superimposed onto their forward field of view through the aircraft windshield. The information displayed may be data or symbolic images indicative of flight conditions such as the operating condition of the aircraft, environmental information or guidance information for use in directing the aircraft to its destination. These images are presented in overlying fashion on the pilot's field of view so as not to interfere with the pilot's view of the background scene.

Although HUDs are useful in a variety of applications, there are several problems with conventional HUDs, among which high cost, narrow viewing angles, mechanical constraints, and low contrast of images are of particular concern. Moreover, conventional combiners are either undesirably thick or heavy for most applications, or are thin and undesirably highly curved. The thick combiners often contain a pair of cooperative lens elements, at least one of which includes an embedded spherical surface coated with a spectrally reflecting thin film. The external surfaces of these thick combiners are flat so as to provide an undistorted view of the background scene. Thin combiners, on the other hand, typically employ a pair of spherical external surfaces, one of which carries the spectrally reflecting thin film. Thin combiners thus typically do not provide the necessary undistorted view of the background scene, especially when the combiner is thick enough to be adequately durable.

The combiner of the HUD is a critical component to provide a collimated display image to a pilot for a given Field of View (FOV) at a given design reference point. As noted, the HUD combiner components are generally large in size. The current HUD combiners are typically comprised of two optical components and with reflection holograms or dielectric coatings on some of the surfaces. They are cemented together or co-mounted in the HUD system configuration which induces complicated assembly and high cost to the HUD system.

Often, HUD applications include the use of combiners with doublet lens. The doublet combiner is composed of a convex front lens and a concave back lens. The convex surface of the convex lens is dichroic or holographically coated for reflecting the HUD format information. Since the optical power of the front lens cancels the optical power of the back lens, there is no optical effect when viewing through the combiner.

U.S. Pat. No. 5,907,416, entitled "Wide FOV Simulator Heads-Up Display With Selective Holographic Reflector Combined", issued to M. Cheren et al, discloses a wide field-of-view simulator heads-up display that provides images to a user along an optical axis. A HUD CRT provides images of a predetermined design wavelength, while rear projection screen CRTs provide images that do not contain the predetermined design wavelength. A curved holographic combiner is mounted on the optical axis with a reflective hologram on a concave surface covered with a urethane overcoat. The convex surface has an antireflective coating. A tilted beamsplitter cooperates with a folding mirror in a relay optical system for providing a virtual image of the HUD CRT for reflection from the holographic combiner.

U.S. Pat. No. 4,968,117, entitled "Graded Index Aspherhic Combiners and Display System Utilizing Same", issued to Chern et al, discloses an optical combiner that includes a substrate with at least one aspheric surface and an diffraction-type reflective coating formed on the substrate for selectively reflecting radiation within one or more predetermined narrow band ranges of wavelengths impinging on the coating. The asphericity of the surface may be selected to compensate or balance optical aberrations. The coating is advantageously a graded-index coating, which eliminates the possible degradation of gelatin hologram coatings due to moisture. A process for applying the graded-index coating to a substrate is disclosed. The variation in the index profile of the coating can be selected to provide the capability of combiners with multiple color reflectivity responses, or which allow use of display light sources of wider spectral bandwidth, resulting in a brighter image and improved angular bandwidth. In another disclosed embodiment, the combiner is incorporated in a biocular helmet visor display resulting in improved optical performance and a simpler, lightweight structure. In another embodiment, the combiner is incorporated into a head-up display for an aircraft resulting in improved performance, lower weight, improved safety and greater look-up capability.

The design of an advanced compact low cost HUD is also dependent on advancing the state of the art of the image source. The image sources of HUDs that exist today have problems relative to volume, cost, mechanical constraints, and high ambient contrast. Typical overhead mounted HUD systems of today consist of cathode-ray tubes (CRTs), projecting onto a combiner via a series of large and complex lenses. Military HUDs are typically mounted behind the forward cockpit displays. Again, they typically consist of CRTs and a series of large lenses with a turning mirror employed in order to project onto the see-through combiner.

An example of an image source for an HUD is described in U.S. Pat. No. 5,436,763, issued to C. W. Chen et al, entitled "Wide Spectral Bandwidth Virtual Image Display Optical System". The '763 patent discloses a vertical image display optical system that uses a CRT in combination with a relay lens group to present an image to a combiner. The relay lens group includes a number of optical elements. U.S. Pat. No. 6,236,511, issued to R. D. Brown, entitled "Beam Combining Optical Element", discloses the use of an image source that is typically a cathode-ray tube that emits an image that includes a green component carried by multiple wavelengths of light within the range of approximately 540–560 nanometers (nm). Both of these patents illustrate the inherent bulkiness of the image sources in prior art HUD systems.

Thus, it is desirable to provide a method and optical display system for producing images and presenting the images for observation in combination with an observer's visual exterior view of an outside scene, which method and system may solve the foregoing-described problems.

SUMMARY OF THE INVENTION

In one broad aspect, the present invention is a head up display system for a vehicle (including but not limited to an aircraft) that includes a compact image source for projecting an image, the compact image source being foldable up toward or into a cockpit ceiling of the vehicle. A combiner reflects the projected image with optical power toward an observer for observation. The combiner is positioned so that the observer, in a line of sight, may see a visual exterior view of an outside scene through the combiner and the projected image in the combiner. In a preferred embodiment, the image source includes an illumination system that includes a high power light emitting diode (LED) array assembly. A Fresnel lens array is operatively associated with the LED array assembly for receiving light produced by the LED and providing a nearly collimated light output. A spatial light modulator receives the nearly collimated light output. The LED array assembly includes LEDs that are "high power". This refers to LED's each having a luminous output of greater than 15 lumens and preferably greater than 20 lumens. The spatial light modulator preferably includes an LCD, preferably a TFT (thin film transistor) (i.e. active-matrix) LCD.

The preferred combiner is a meniscus combiner that includes a meniscus lens; a multi-layer dichroic coating formed on a first surface of the meniscus lens; and, an anti-reflection coating formed on a second, opposite surface of the meniscus lens. The meniscus combiner preferably utilizes a non-symmetric aspheric meniscus lens which simplifies the optical system of the image source (overhead or in-dash unit) minimizing aberrations and minimizing costs. The meniscus combiner may be fabricated utilizing a number of lens sections which may be bonded together and blended. Use of multiple lens sections provides the ability to easily optimize the lens design. Alternatively, it can be fabricated from a single lens. The present system provides utilization of small components minimizing costs and making it easy to manufacture.

Alternative image sources may include, for example, organic LEDs (OLEDs). Alternative combiners may include, for example, doublet lens, or combiners coated surfaces which are spherical, toric, aspherical, or asymmetric aspheric.

In another broad aspect, the present invention is a head up display system for a vehicle that includes a compact image source for projecting an image, the compact image source being positioned behind a dashboard of a vehicle.

BRIEF DESCRIPTION OF THE DRAWINGS

The numerous advantages of the present invention may be better understood by those skilled in the art by reference to the accompanying figures in which.

The same elements or parts throughout the figures of the drawings are designated by the same reference characters.

DETAILED DESCRIPTION OF THE INVENTION

Reference will now be made in detail to the presently preferred embodiments of the invention, examples of which are illustrated in the accompanying drawings.

In an exemplary aspect, the present invention may utilize a flat panel LCD as an image source and a beam combination mirror (BCM) or curved beam combination mirror (CBCM) as a combiner. Conventional combiners are either undesirably thick and heavy for most applications, or are thin and undesirably highly curved. The thick combiners often contain a pair of cooperative lens elements, at least one of which includes an embedded spherical surface coated with a spectrally reflecting thin film. The external surfaces of these thick combiners are flat so as to provide an undistorted view of the background scene. Thin combiners, on the other hand, typically employ a pair of spherical external surfaces, one of which carries the spectrally reflecting thin film. Thin combiners thus typically do not provide the necessary undistorted view of the background scene, especially when the combiner is thick enough to be adequately durable. Compared to a conventional combiner which often includes two or more lens elements, the present CBCM or BCM may include a single lens element. A BCM is a combiner which reflects light of a selected wavelength range and passes light of other wavelength ranges through. Relatively small BCMs may be used to reflect larger images. A CBCM is a combiner which is curved and reflects light of a selected wavelength range with optical power (i.e., magnification) and passes light of other wavelength ranges through. A CBCM may be spherical or non-spherical. When a CBCM is used, large images may be generated from a small LCD. Using a CBCM or BCM with a single lens element, the cost of a HUD may be greatly reduced. The present invention may utilize the LCD as an image source, which may generate images with very high contrast ratio. This is particularly the case when non-lambertian light sources are used in combination with the LCD. Being illuminated by highly efficient LEDs (Light Emitting Diodes) (with green LEDs being the most typical for HUD use), the flat panel LCD may be made very thin and light weight. Moreover, at least one of a compensation film, a Fresnel type lens, a holographic device, or a brightness enhancement film may be included in the LCD to tailor (i.e., manage or redirect) the light passing through the LCD. Furthermore, the image source may be located at nearly any position i.e. sides, top, bottom, or at an angle relative to the CBCM or BCM. By electronically warping the image keystone and other distortions may be easily corrected. In addition, a HUD in accordance with the present invention may have very wide viewing angles, which may allow cross cockpit viewing or crosschecking.

Figure 1A:
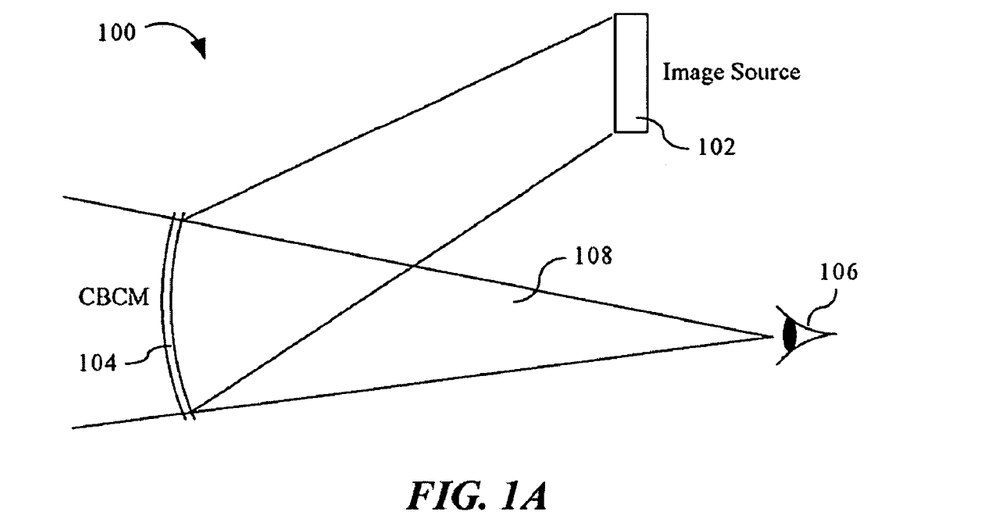
FIGS. 1A and 1B are schematic diagrams illustrating an optical display system for producing images and presenting the images for observation in combination with an observer's visual exterior view of an outside scene using a curved beam combination mirror (CBCM) in accordance with an exemplary embodiment of the present invention.
Figure 1B:
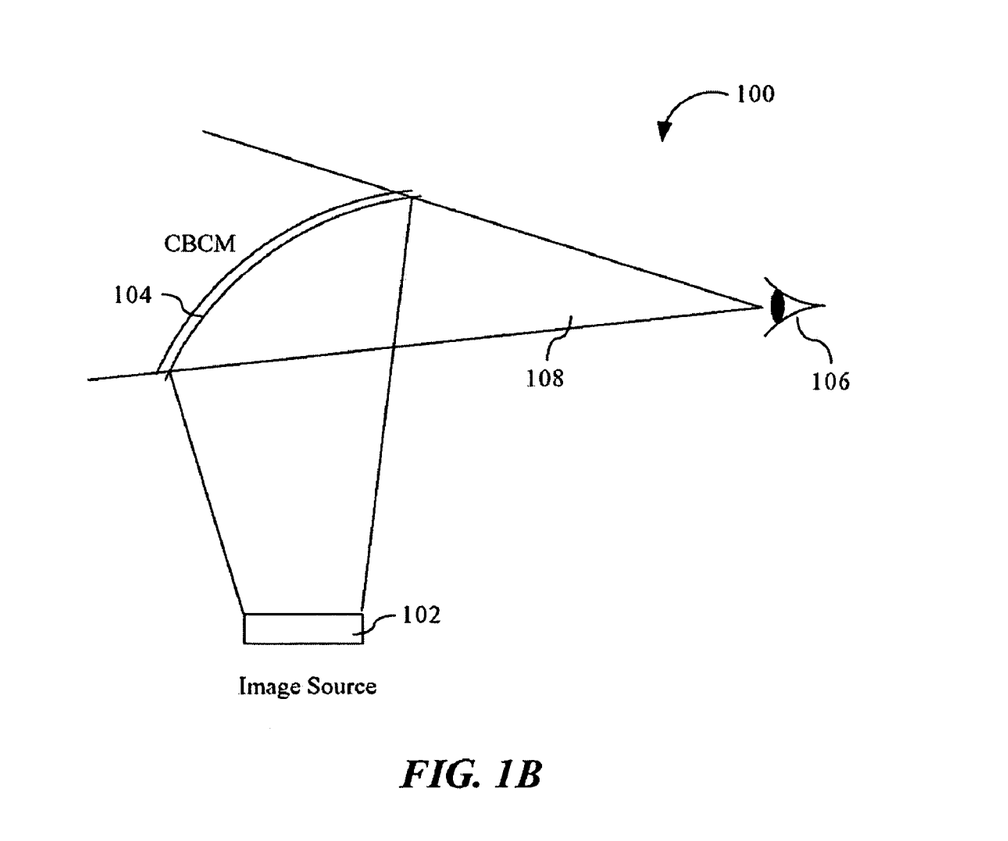

Referring now to FIGS. 1A and 1B, schematic diagrams illustrating an optical display system 100 for producing images and presenting the images for observation in combination with an observer's visual exterior view of an outside scene using CBCM in accordance with an exemplary embodiment of the present invention are shown. The optical display system 100 may be a HUD, or the like. The optical display system 100 may include an image source 102 for projecting an image, and a curved beam combination mirror (CBCM) 104 for reflecting the projected image with optical power toward an observer 106 for observation. The CBCM 104 may be spherical or non-spherical. The image source 102 may be a transmissive LCD, reflective LCD, digital micromirror device, laser display, or the like. For example, the image source 102 may be a flat panel LCD. When the image source 102 is an LCD, the LCD 102 may include a non-Lambertian light source, or may include at least one green LED (Light Emitting Diode) for illumination, and the LCD 102 may include at least one of a compensation film, a Fresnel type lens, a holographic device, or a brightness enhancement film for redirecting (i.e., tailoring or managing) light passing through the LCD 102.

The curved beam combination mirror (CBCM) 104 may be positioned so that the observer 106, in a line of sight 108, may see a visual exterior view of an outside scene through the curved beam combination mirror (CBCM) 104 and the projected image in the curved beam combination mirror (CBCM) 104. The projected image in the curved beam combination mirror (CBCM) 104 may be no smaller than the LCD 102. In a preferred embodiment, the curved beam combination mirror (CBCM) 104 is suitable for focusing the projected image in the curved beam combination mirror (CBCM) 104 at infinity. This way, the observer 106 (e.g., a pilot, a co-pilot, or the like) may simultaneously watch the projected image in the CBCM 104 and the visual exterior view of an outside scene in the line of sight 108, without refocusing the eyesight of the observer 106.

According to the present invention, the image source 102 may be located at any angle relative to the line of sight 108 of the observer 106. For example, the image source 102 may be located above the line of sight 108 (see FIG. 1A) or below the line of sight 108 (see FIG. 1B). This way, flexibility in terms of relative positions between the combiner and the image source may be provided, thereby leading to a great convenience when placing the optical display system 100 in a crowed place (e.g., an airplane cockpit, a combat tank, or the like). The optical display system 100 may allow wide viewing angles to enable at least one of cross-cockpit viewing or crosschecking of the projected image in the curved beam combination mirror (CBCM) 104.

Figure 2A:
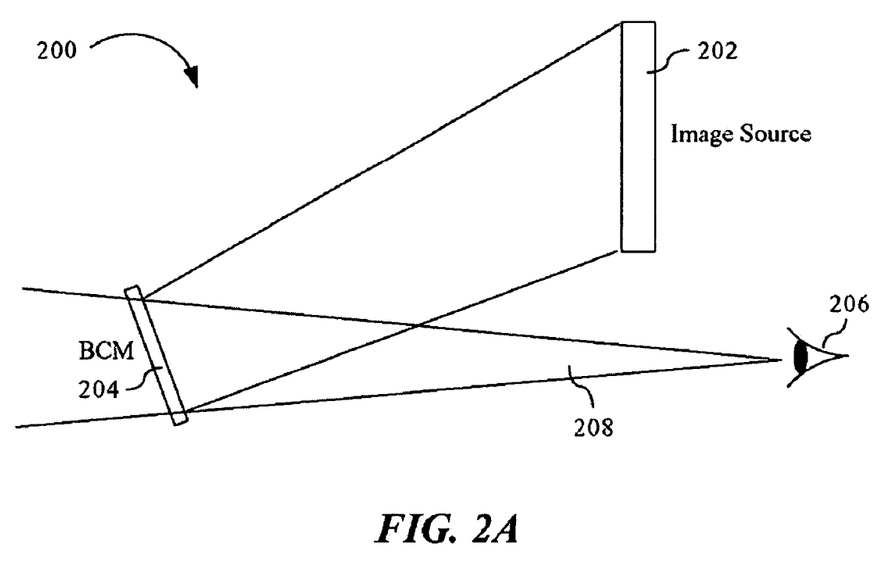
FIGS. 2A and 2B are schematic diagrams illustrating an optical display system for producing images and presenting the images for observation in combination with an observer's visual exterior view of an outside scene using a beam combination mirror (BCM) in accordance with an exemplary embodiment of the present invention.
Figure 2B:
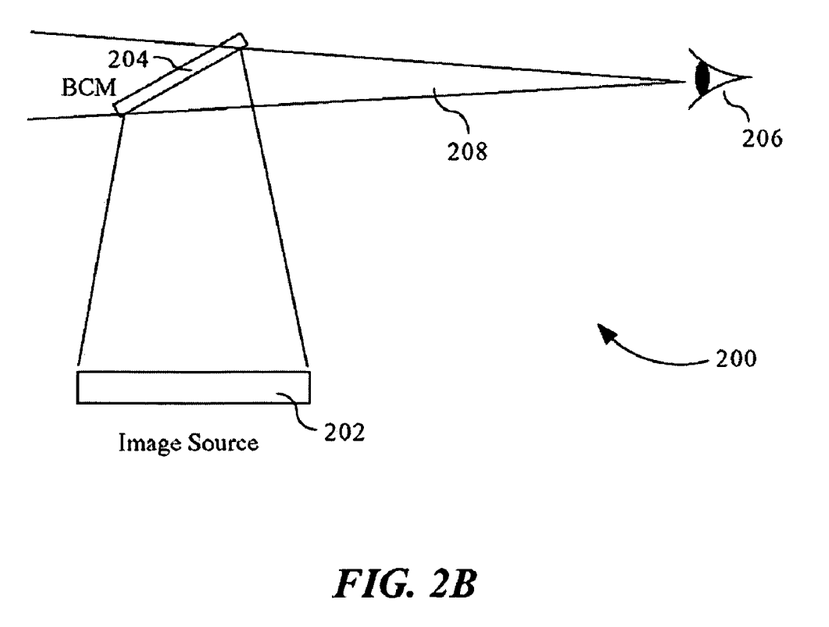

Referring to FIGS. 2A and 2B, schematic diagrams illustrating an optical display system 200 for producing images and presenting the images for observation in combination with an observer's visual exterior view of an outside scene using BCM in accordance with an exemplary embodiment of the present invention are shown. The optical display system 200 may be a HUD, or the like. The optical display system 200 may include an image source 202 for projecting an image, and a beam combination mirror (BCM) 204 for reflecting the projected image toward an observer 206 for observation. The image source 202 may be a transmissive LCD, reflective LCD, digital micromirror device, laser display, or the like. For example, the image source 202 may be a flat panel LCD. When the image source 202 is a LCD, the LCD 202 may include a non-Lambertian light source, or may include at least one green LED (Light Emitting Diode) for illumination, and the LCD 202 may include at least one of a compensation film, a Fresnel type lenses, a holographic device, or a brightness enhancement film for redirecting (i.e., tailoring or managing) light passing through the LCD 202.

The beam combination mirror (BCM) 204 may be positioned so that the observer 206, in a line of sight 208, may see a visual exterior view of an outside scene through the beam combination mirror (BCM) 204 and the projected image in the beam combination mirror (BCM) 204. The projected image in the beam combination mirror (BCM) 204 may be smaller than the LCD 202. The beam combination mirror (BCM) 204 may be not suitable for focusing the projected image in the beam combination mirror (BCM) 204 at infinity. Accordingly, the observer 206 (e.g., a pilot, a co-pilot, a vehicle driver, or the like) may not be able to simultaneously watch the projected image in the CBCM 204 and the visual exterior view of an outside scene in the line of sight 208 without refocusing the eyesight of the observer 206. However, the optical display system 200 may still provide some convenience for the observer 206 since the observer 206 does not need to look down at the control panel. Instead, the observer 206 may watch the projected image in the CBCM 204 and the visual exterior view of an outside scene in the line of sight 208, with the eyesight of the observer 206 refocused. The optical display system 200 may be applied to a situation (e.g., a combat tank, a driving vehicle, or the like), where the time spent by the observer 206 on refocusing his or her eyesight is not of critical importance.

According to the present invention, the image source 202 may be located at any angle relative to the line of sight 208 of the observer 206. For example, the image source 202 may be located above the line of sight 208 (see FIG. 2A) or below the line of sight 208 (see FIG. 2B). This way, flexibility in terms of relative positions between the combiner and the image source may be provided, thereby leading to a great convenience when placing the optical display system 200 in a crowded place (e.g., an airplane cockpit, a combat tank, or the like). The optical display system 200 may allow wide viewing angles to enable at least one of cross-cockpit viewing or crosschecking of the projected image in the beam combination mirror (BCM) 204.

Figure 3:
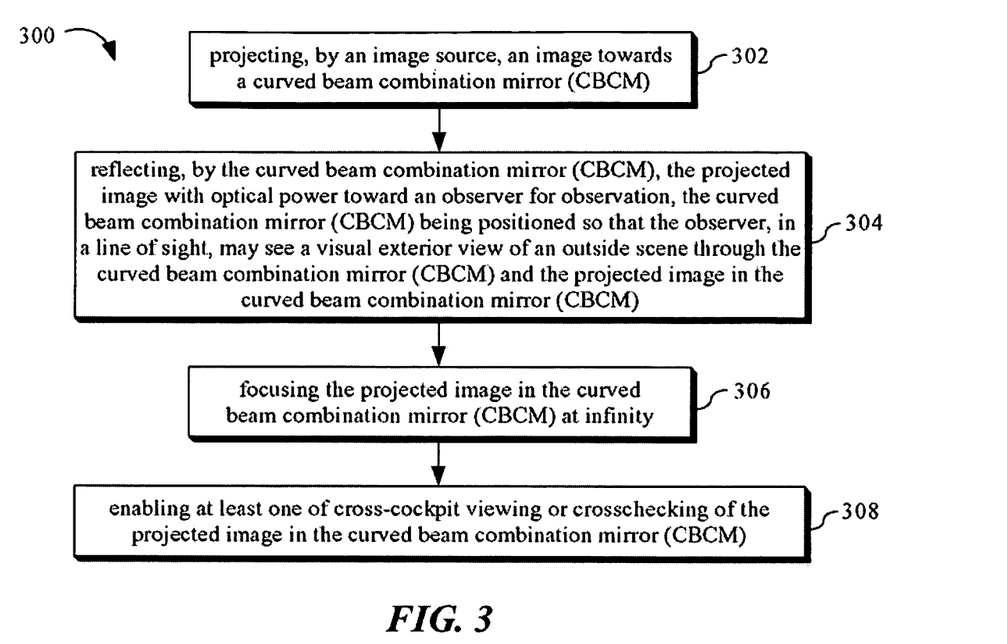
FIG. 3 is a flow diagram of a method for producing images and presenting the images for observation in combination with an observer's visual exterior view of an outside scene using CBCM in accordance with an exemplary embodiment of the present invention.

FIG. 3 is a flow diagram of a method 300 for producing images and presenting the images for observation in combination with an observer's visual exterior view of an outside scene using CBCM in accordance with an exemplary embodiment of the present invention. The method 300 may be implemented in the optical display system 100 shown in FIGS. 1A and 1B. The method 300 may start with a step 302 in which an image is projected towards a curved beam combination mirror (CBCM) by an image source. The CBCM may be spherical or non-spherical. The image source may be a transmissive LCD, reflective LCD, digital micromirror device, laser display, or the like. For example, the image source may be a flat panel LCD. When the image source is a LCD, the LCD may include a non-Lambertian light source, or may include at least one green LED (Light Emitting Diode) for illumination, and the LCD may include at least one of a compensation film, a Fresnel type lenses, a holographic device, or a brightness enhancement film for redirecting (i.e., tailoring or managing) light passing through the LCD.

In step 304, the projected image may be reflected by the curved beam combination mirror (CBCM) with optical power toward an observer for observation, and the curved beam combination mirror (CBCM) may be positioned so that the observer, in a line of sight, may see a visual exterior view of an outside scene through the curved beam combination mirror (CBCM) and the projected image in the curved beam combination mirror (CBCM). The projected image in the curved beam combination mirror (CBCM) may be no smaller than the LCD. The image source may be located at any angle relative to the line of sight of the observer. For example, the image source may be located above the line of sight or below the line of sight.

The projected image in the CBCM may be focused at infinity 306. This way, the observer (e.g., a pilot, a co-pilot, a vehicle driver, or the like) may simultaneously watch the projected image in the CBCM and the visual exterior view of an outside scene in the line of sight, without refocusing the eyesight of the observer. At least one of cross-cockpit viewing or crosschecking of the projected image in the CBCM may be enabled by the CBCM 308.

Figure 4:
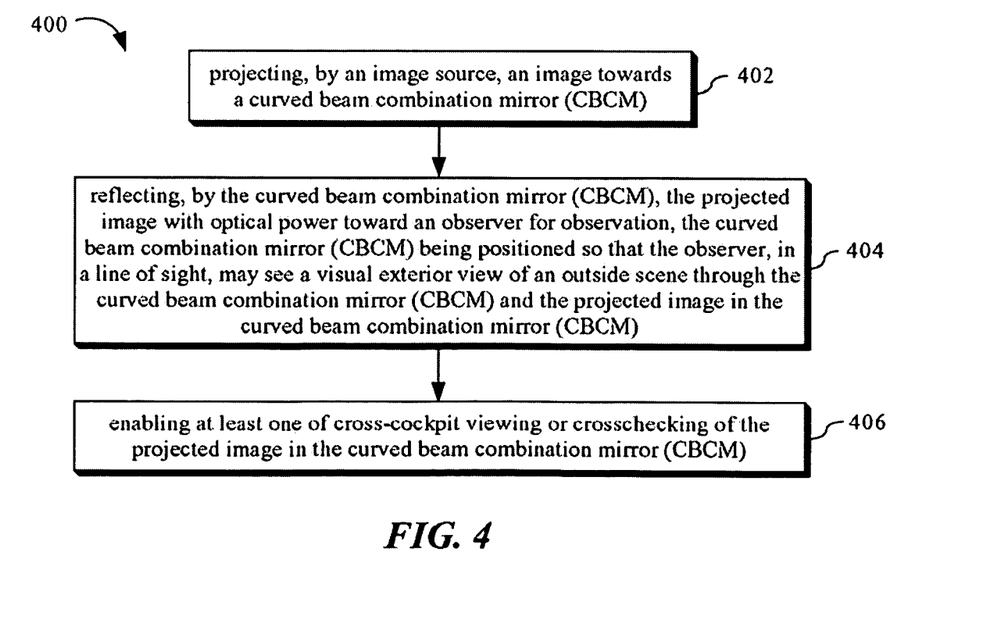
FIG. 4 is a flow diagram of a method for producing images and presenting the images for observation in combination with an observer's visual exterior view of an outside scene using BCM in accordance with an exemplary embodiment of the present invention.

FIG. 4 is a flow diagram of a method 400 for producing images and presenting the images for observation in combination with an observer's visual exterior view of an outside scene using BCM in accordance with an exemplary embodiment of the present invention. The method 400 may be implemented in the optical display system 200 shown in FIGS. 2A and 2B. The method 400 may start with a step 402 in which an image is projected towards a beam combination mirror (BCM) by an image source. The image source may be a transmissive LCD, reflective LCD, digital micromirror device, laser display, or the like. For example, the image source may be a flat panel LCD. When the image source is a LCD, the LCD may include a non-Lambertian light source, or may include at least one green LED (Light Emitting Diode) for illumination, and the LCD may include at least one of a compensation film, a Fresnel type lenses, a holographic device, or a brightness enhancement film for redirecting (i.e., tailoring or managing) light passing through the LCD.

In step 404, the projected image may be reflected by the beam combination mirror (BCM) toward an observer for observation, and the beam combination mirror (BCM) may be positioned so that the observer, in a line of sight, may see a visual exterior view of an outside scene through the beam combination mirror (BCM) and the projected image in the beam combination mirror (BCM). The projected image in the beam combination mirror (BCM) may be smaller than the LCD. The image source may be located at any angle relative to the line of sight of the observer. For example, the image source may be located above the line of sight or below the line of sight. At least one of cross-cockpit viewing or crosschecking of the projected image in the BCM may be enabled by the BCM 406.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

Figure 5:
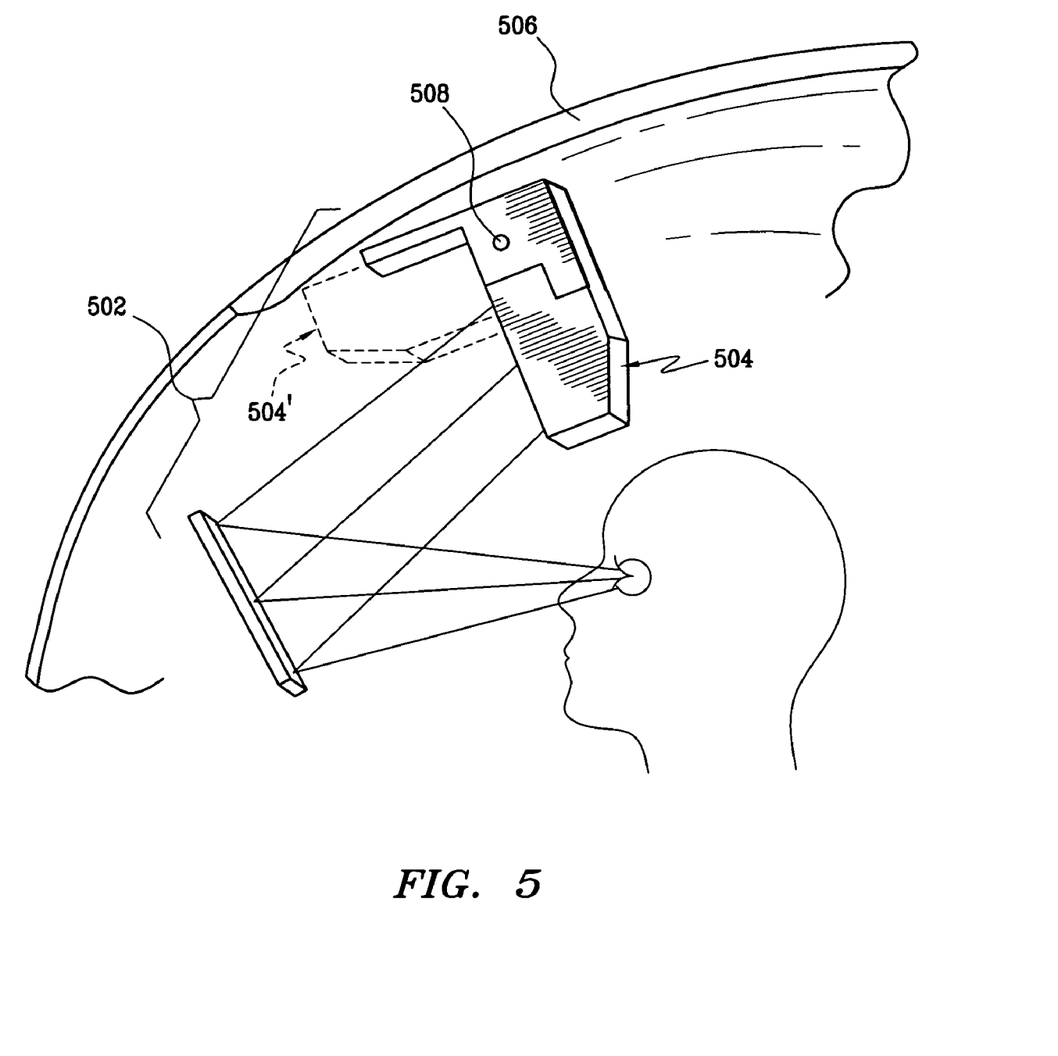
FIG. 5 is a perspective illustration of a preferred embodiment of the invention in which an advanced compact HUD includes an image source that is foldable into a ceiling of a vehicle.

Referring now to FIG. 5, an embodiment of an advanced compact head up display system is illustrated, designated generally as 502, in which the image source 504 is very compact such that it can be folded into or adjacent to the cockpit ceiling 506 of an aircraft, as shown in phantom, designated as 504'. This folding is shown about a pivot 508. Such a folding can be implemented by a variety of methods.

Figure 6:
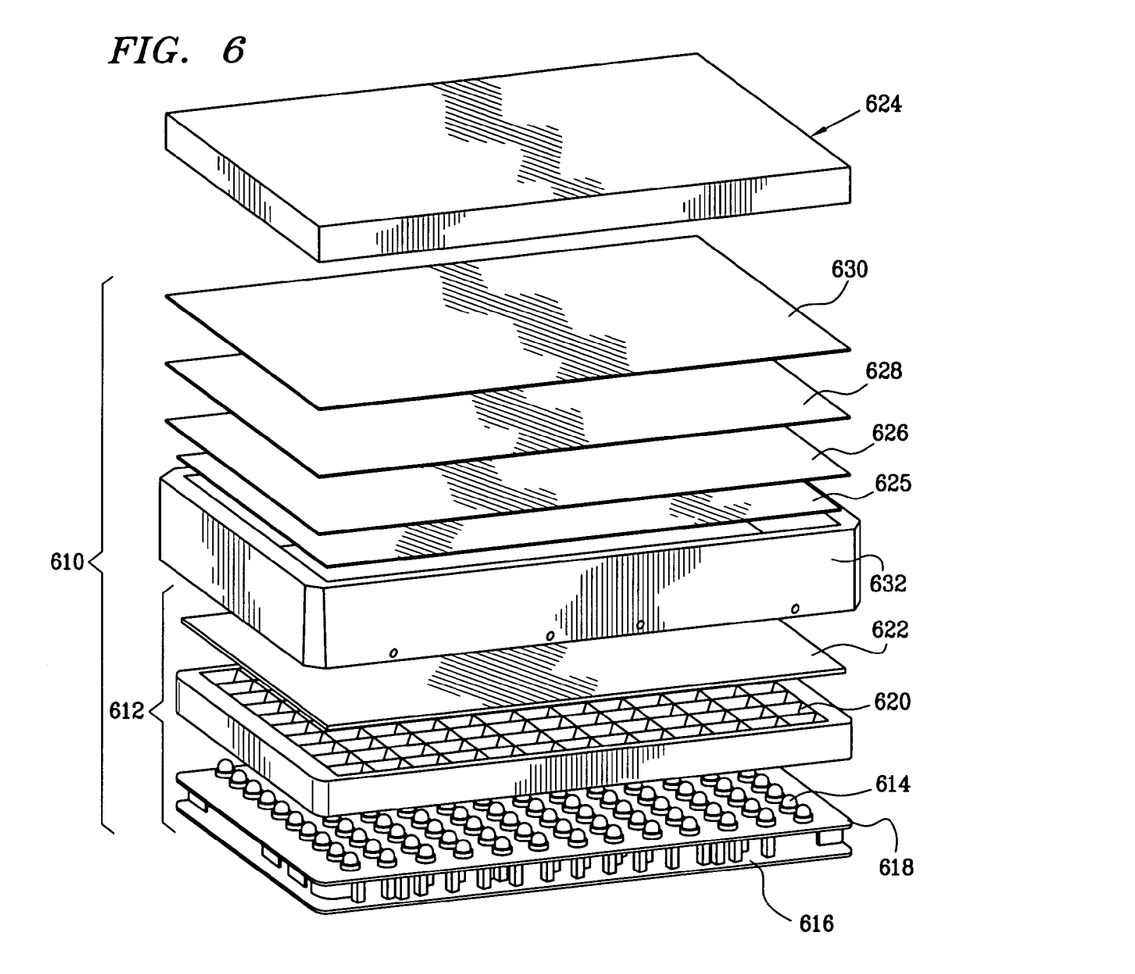
FIG. 6 is an exploded perspective view of a preferred embodiment of the HUD illumination system for the advanced compact of the present invention, shown in relation to an LCD.
Figure 7:
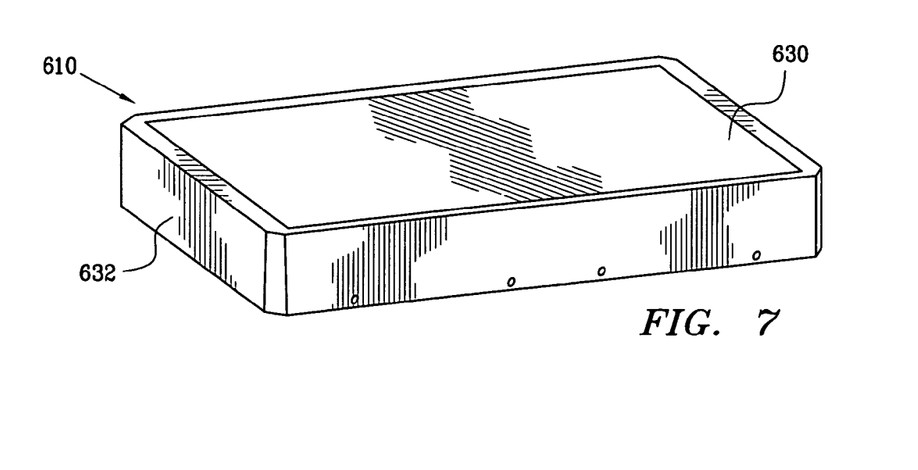
FIG. 7 is a perspective view of the assembled illumination system of FIG. 6.
Figure 8:
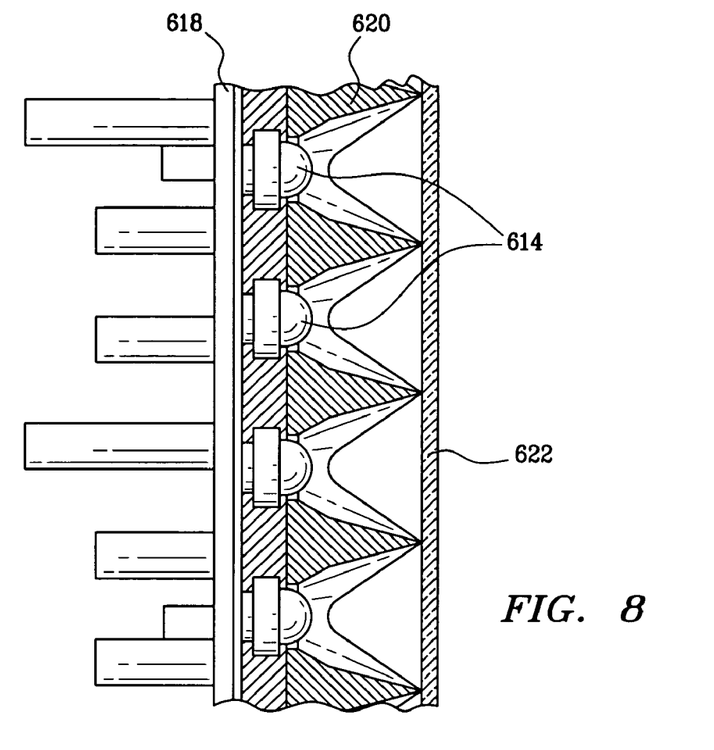
FIG. 8 is a cross-sectional view of the illumination system of FIG. 6.

In one preferred embodiment the image source comprises an illumination system that includes an illumination system that includes a high power light emitting diode (LED) array assembly. A Fresnel lens array is operatively associated with the LED array assembly for receiving light produced by the LED and providing a nearly collimated light output. A spatial light modulator receives the nearly collimated light output. The spatial light modulator preferably includes an LCD. This illumination system is fully described and claimed in the patent application entitled "Illumination System For a Head Up Display," U.S. Ser. No. 11/196,999, filed concurrently herein (bearing assignee Rockwell Collin's Internal). This co-filed patent application is incorporated by reference herein in its entirety. Referring now to FIGS. 6–8, such an illumination system is illustrated, designated generally as 610. The illumination system 610 includes a high power light emitting diode (LED) array assembly, designated generally as 612. The LED array assembly 612 includes LEDs 614 that are "high power". This refers to LED's each having a luminous output of greater than 15 lumens and preferably greater than 20 lumens. In a preferred embodiment each LED has an output of about 36 lumens. (Green LEDs are the most typical for HUD use.)

The LED array assembly 612 includes suitable driving electronic circuitry 616 for powering the LEDs 614 and an LED heat sink 618, as is well known in this field. Furthermore, a suitable LED light baffle 620 is utilized as is also well known in this field. Such a light baffle 620 is typically aluminum but could also be manufactured from almost any metallic or plastic material and then may be painted with reflective paint if the material is not already reflective. In applicant's present application for use with a compact HUD a 10×13 LED array is utilized. It may be, for example, a Luxeon™ emitter.

A Fresnel lens array 622 is operatively associated with the LED array for receiving light produced by the LED and providing a nearly collimated light output for use by a spatial light modulator 624. The Fresnel lens array should be consistent in size with the LED array assembly 12.

A diffuser 625 is positioned to receive light from the Fresnel lens array. The diffuser 625 may be, for example, a holographic diffuser (i.e. holographic light shaping diffuser (HLSD)) or bulk scattering diffuser. For the HUD application discussed above, the diffuser angle may be less than 20 degrees.

At least one brightness enhancement film (BEF) 626, 628 is preferably used to receive the light from the diffuser 625. Such prismatic BEF's are commercially available from companies such as 3M Company, St. Paul Minn. that markets BEFs under the trademark Vikuiti™. A dual brightness enhancement filter (DBEF), may be utilized.

An image directing film (IDF) 630, typically a transparent optical composite prismatic film, redirects the output image of the BEF 628, to the optimum viewing angle. IDFs are manufactured by 3M Company under the trademark Vikuiti™ and by Physical Optics Corp., Torrance, Calif.

The image from the IDF 630 is finally directed to the spatial light modulator 624. The spatial light modulator 624 may be an LCD, preferably a TFT (thin film transistor) (i.e. active-matrix) LCD. The illumination system 610 is typically housed in a metal frame 632 but could be manufactured from any applicable material such as metal or plastic. Instead of utilizing a Fresnel lens a collimating lens may be used for providing a nearly collimated light output for use by the spatial light modulator. In such an instance, the collimating lens may, for example, be molded into the plastic case of the LED array assembly.

Although the invention has been preferably described as having diffusers, BEFs and IDFs some of these components may not be essential to the invention. They are utilized in accordance with the design parameters and desired performance of the system. If the optical performance gains are viewed as providing only marginal improvement for a given set of specifications these optical elements may or may not be included in the design.

Figure 9:
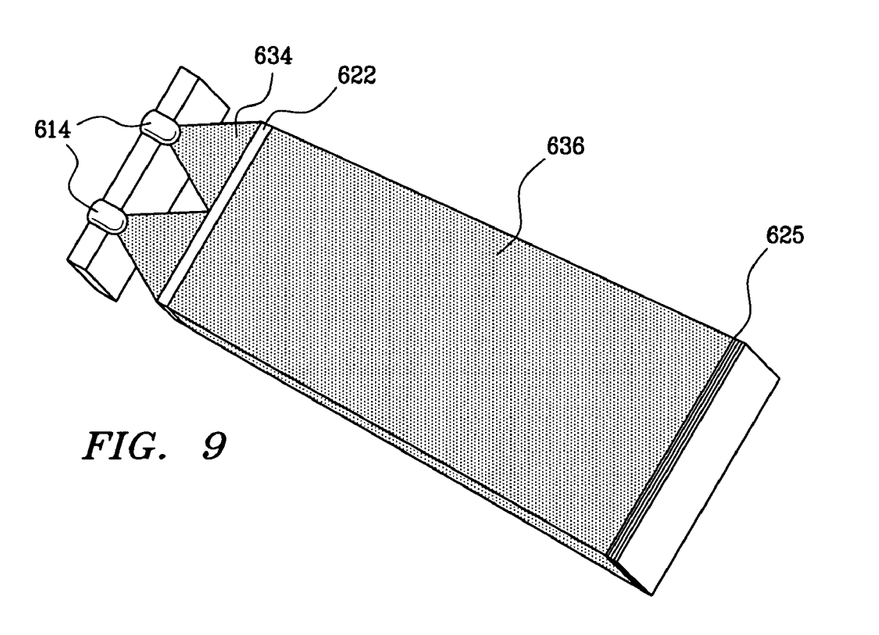
FIG. 9 is a schematic view of the light output from two LEDs, illustrating the collimation of the light and its passage through the illumination system.

Referring now to FIG. 9 the light emission path for two LEDs in the LED array 614 is illustrated. It can be seen that each of two LEDs emits light that is maintained substantially conical (numeral designation 634) by the light baffle 620. Upon passing through the Fresnel lens array 622 the light is nearly collimated, as shown by numeral designation 636.

Although use of a Fresnel lens is preferred, instead of utilizing a Fresnel lens, a collimating lens may be used for providing a nearly collimated light output for use by the spatial light modulator. In such an instance, the collimating lens may, for example, be molded into the plastic case of the LED array assembly.

In another embodiment, instead of utilizing the illumination system discussed above, the image source may be an organic LED (OLED). Such light-emitting, fast switching diodes are made from polymers as well as from semiconductors. Generally, starting from a standard LCD glass covered with structured ITO (Indium-Tin-Oxide), the polymer materials are applied by precision ink jet printing. Using this technology, pixels of red, green, and blue material are applied. After the patterned cathode has been applied via metal evaporation, the cell is sealed.

OLED technology is known in this field and products are offered by various companies such as L. G. Philips, Sony Electronics, Kodak and Sanyo. L. G. Philips' thin-film PolyLED technology will enable the production of full-color displays less than 1 mm thick. Combined with a large viewing angle, high brightness and contrast, and full video capability, PolyLED displays are ideal for their utilization with a HUD display.

They can provide a very bright, high quality image at a minimal cost. Further, they utilize material with self-luminous properties that eliminates the need for a backlight. While backlighting is a crucial component to improving brightness in LCDs, it also adds significant cost as well as requiring extra power. Further, OLEDs are light.

Polymer LEDs have several inherent properties that afford unique possibilities, such as: 1) All colors of the visible spectrum are available. 2) High brightness is achieved at low drive voltages/current densities. 3) No viewing angle dependence. 5) High response speeds allow display of high quality video.

A screen based on OLEDs has obvious advantages: the screen is lightweight and flexible, so that it can be rolled up.

Figure 10:
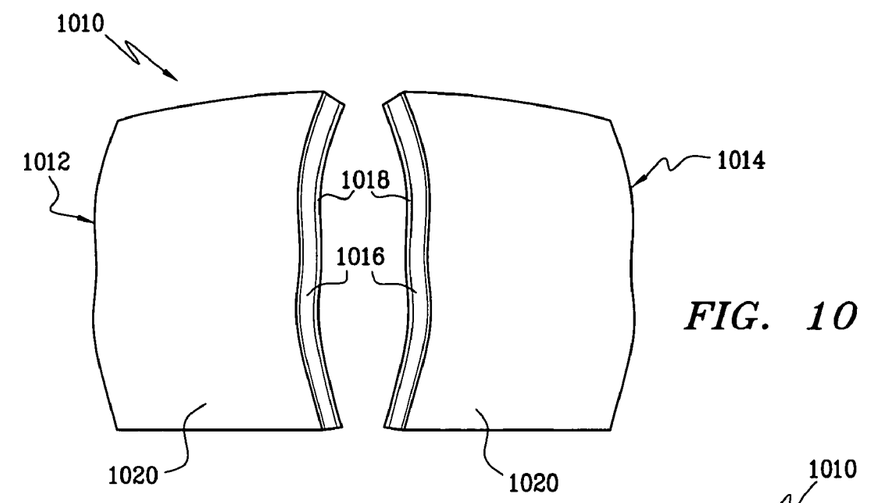
FIG. 10 is a perspective view of a first embodiment of a non-symmetric aspheric meniscus combiner of the advanced compact HUD of the present invention prior to the bonding of the two lens sections thereof.
Figure 11:
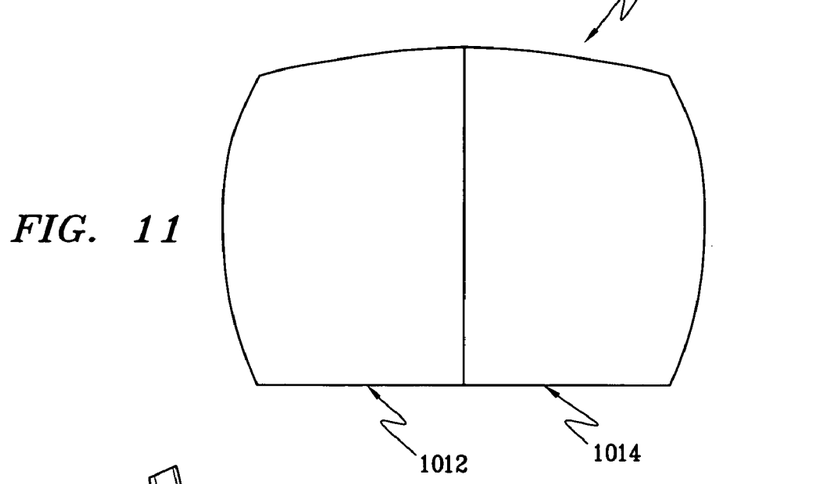
FIG. 11 shows the two lens sections of the FIG. 10 embodiment bonded together to form a completed combiner.
Figure 12:
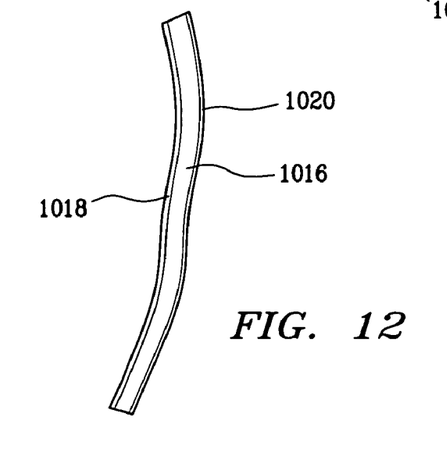
FIG. 12 is a side view of the combiner of FIGS. 10 and 11.
Figure 13:
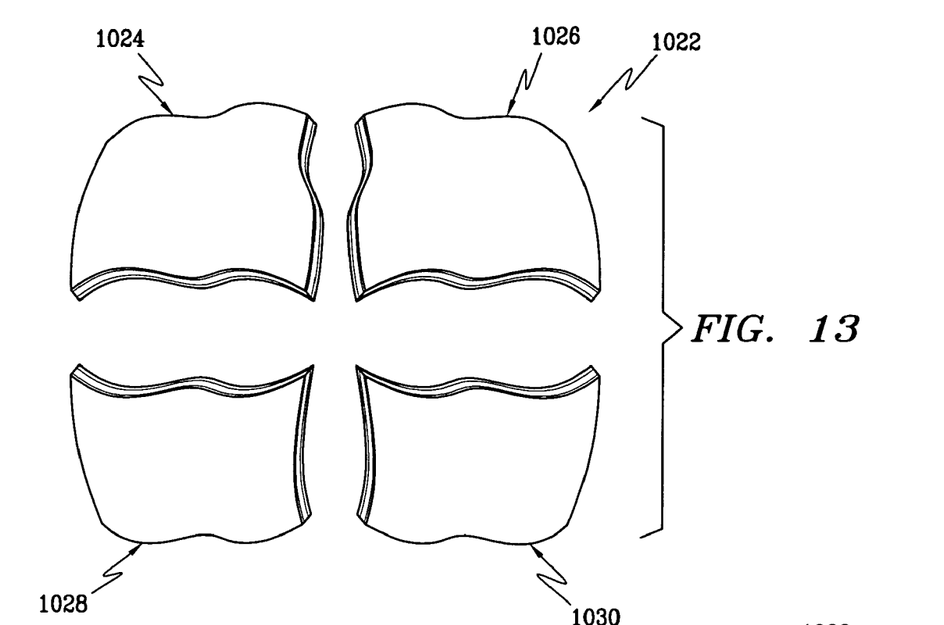
FIG. 13 is a perspective view of a second embodiment of a non-symmetric aspheric meniscus combiner of the present invention prior to the bonding of the four lens sections thereof.
Figure 14:
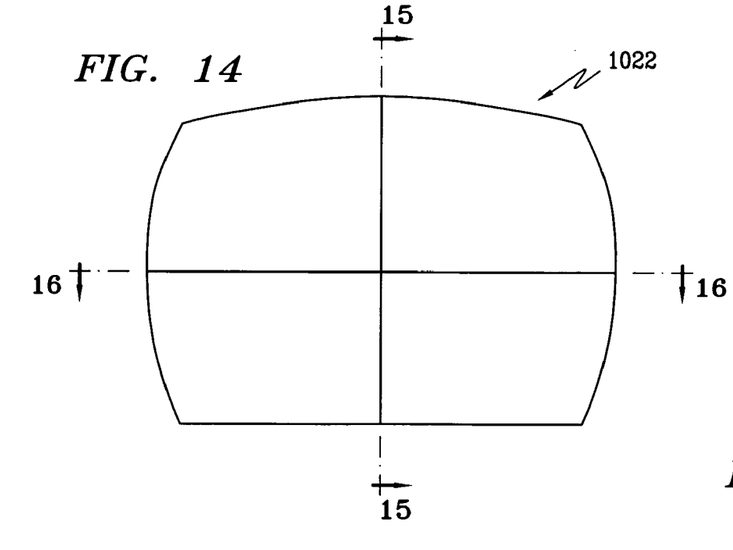
FIG. 14 shows the four lens sections of the FIG. 13 embodiment bonded together to form a completed combiner.
Figure 15:
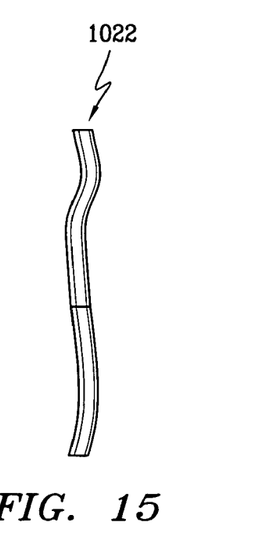
FIG. 15 is a view taken along line 15—15 of FIG. 14.
Figure 16:
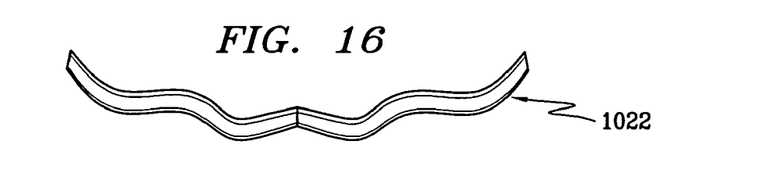
FIG. 16 is a view taken along line 16—16 of FIG. 14.

FIGS. 10–12 illustrate a preferred embodiment of the preferred combiner used for the advanced compact HUD of FIG. 5. This preferred combiner is a meniscus combiner, designated generally as 1010. U.S. Ser. No. 11/196,904, entitled, "Meniscus Head Up Display Combiner", filed concurrently herewith, by co-applicants, G. Peng and M. J. Steffensmeier, and assigned to the present assignee (bearing Rockwell Collins Internal), discloses such a meniscus combiner that includes a meniscus lens; a multi-layer dichroic coating formed on a first surface of the meniscus lens; and, an anti-reflection coating formed on a second, opposite surface of the meniscus lens. This co-filed patent application is incorporated by reference herein in its entirety.

As shown in FIG. 10, the meniscus combiner 1010 may be fabricated by using, for example, a pair of lens sections 1012, 1014. Each lens section 1012, 1014 includes a meniscus lens 1016. A multi-layer dichroic coating 1018 is formed on a first surface of each of the meniscus lens sections 1012, 1014. An anti-reflection coating 1020 is formed on a second, opposite surface of the meniscus lens 1016. Each lens section 1012, 1014 is non-symmetric aspheric, i.e. contains non-spherical optical surfaces. Separate sections 1012, 1014 are bonded with suitable cement and blended together to form a single high performance component, as shown in FIG. 11.

Utilization of these piecewise aspheric lens sections 1012, 1014 allows for enhanced freedom in design. The meniscus lens 1016 may be formed of a suitable material such as plastic or glass. The multi-layer dichroic coating 1018 is preferably formed of a stack of quarterwave (QW) layers of alternating high- and low-index dielectric material so that the dichroic coating selectively reflects a desired narrow band head-up image wavelength. In one example, this is defined by a peak wavelength of 530 nm, 50% cutoff wavelengths of 507 nm and 546 nm; and photopic transmission greater than 75% from an eye center point. Such a dichroic coating 1018 is commercially available. The dichroic coating is typically applied to the surface closest to the viewer.

The anti-reflection coating 1020 is applied to the convex surface of the meniscus lens 1016. In a preferred example, the anti-reflection coating is a broad band antireflective coating with an average reflectance of less than 0.2% from the wavelength of 420 nm to 680 nm. The 0.2% reflectance can be relaxed as long as there is no clear non required second mirror image. Suitable anti-reflection coatings are commercially available as is well known in this field.

Referring now to FIGS. 13–16 a second embodiment of the meniscus combiner is illustrated, designated generally as 1022. In this embodiment four aspheric lens sections 1024, 1026, 1028, 1030 are utilized. This embodiment emphasizes that fabrication utilizing various aspheric lens sections provides the ability to easily optimize the lens design. However, it is understood that a single meniscus lens could be used.

The non-symmetric aspheric meniscus lens has a first fitting radius of curvature in a range of between about 15 and 30 inches and a second fitting radius of curvature approximately 3 inches greater than the first fitting radius of curvature. The second fitting radius of curvature is orthogonal to the first fitting radius of curvature. The first fitting radius of curvature is defined by an upper edge point, a lower edge point and a central point of the meniscus lens. The second fitting radius of curvature is defined by a left side edge, a right side edge, and the central point. The first fitting radius of curvature is preferably about 20 inches and the second fitting radius of curvature is approximately 23 inches.

The meniscus lens preferably provides a total field of view between 10° (H)×8° (V) and 40° (H)×36°(V) when located at a distance ranging from about 6 inches to about 24 inches in front of an operator.

Although not shown herein, the meniscus combiner could be a spherical meniscus lens; however, if a spherical meniscus lens is utilized additional optical components may be required to minimize aberrations.

Other combiners can alternatively be used that utilize, for example a doublet lens. Still other combiners can be utilized such as with coated surfaces which are spherical, toric, aspherical, or asymmetric aspheric.

A head-motion-box is preferably provided having dimensions greater than about 3 inches horizontal, 2 inches in vertical, and 4 inches in depth. The head-motion-box defines a volume within which at least part of the HUD image information can be viewable.

The compact image source forms a vertical image height less than about 4.3 inches. It has a vertical image height less than about 6 inches, preferably less than 3 inches. It preferably provides a maximum brightness of about 3000 fl and a dimmable image brightness in a range of about 2000:1.

By electronically warping, the image keystone and other distortions may be corrected.

Figure 17:
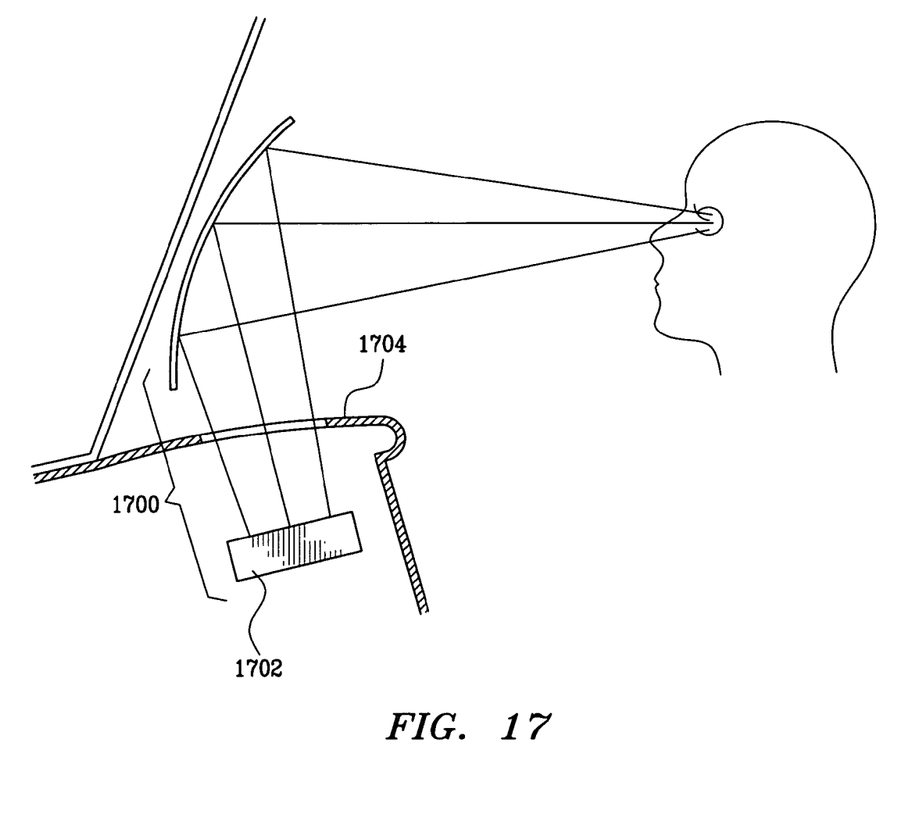
FIG. 17 is a perspective illustration of a preferred embodiment of the invention in which an advanced compact HUD includes an image source that is positioned in a dashboard of a vehicle.

Referring now to FIG. 17, another embodiment of the head up display system is illustrated, designated generally as 1700, in which the compact image source 1702 is positioned within an opening behind a dashboard 1704 of an aircraft. Such in-dash mounted head up display systems 1700 are generally utilized with military aircraft.

Although the combiners have been described relative to their use with overhead mounted and dash mounted displays the image source may be located at nearly any position, i.e. sides, top, bottom, or at another angle relative to the combiner.

Other embodiments and configurations may be devised without departing from the spirit of the invention and the scope of the appended claims.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A head up display system for a vehicle, comprising:
   a compact image source for projecting an image, said compact image source being foldable up into a cockpit ceiling of the vehicle; and
   a combiner for reflecting said projected image with optical power toward an observer for observation, said combiner being positioned so that said observer, in a line of sight, sees a visual exterior view of an outside scene through said combiner and said projected image in said combiner, wherein said combiner comprises a meniscus combiner, comprising:
   a meniscus lens;
   a multi-layer dichroic coating formed on a first surface of said meniscus lens; and;
   an anti-reflection coating formed on a second, opposite surface of said meniscus lens.

2. The head up display system of claim 1, wherein said compact image source comprises a liquid crystal display (LCD) in cooperation with a light emitting diode (LED).

3. The head up display of claim 1, wherein said compact image source comprises:
   an illumination system, comprising:
   a light emitting diode (LED) array assembly;
   a Fresnel lens array operatively associated with said LED army assembly for receiving light produced by said LED and providing a nearly collimated light output; and,
   a spatial light modulator for receiving said nearly collimated light output, said spatial light modulator comprising an LCD.

4. The head up display system of claim 1, wherein said compact image source comprises:
   an illumination system, comprising:
   a light emitting diode (LED) array assembly; and
   a Fresnel leans array operatively associated with said LED assembly for receiving light produced by said LED and providing a nearly collimated light output; and,
   a spatial light modulator for receiving said nearly collimated light output, said spatial light modulator comprising an LCD, said LCD comprising an active matrix liquid crystal display (AMLCD).

5. The head up display system of claim 1, wherein said compact image source comprises an Organic LED (OLED).

6. The head up display system of claim 1, wherein said compact image source forms a vertical image height less than about 4.3 inches.

7. The head up display system of claim 1, wherein said compact image source has a vertical image height less than about 6 inches.

8. The head up display system of claim 1, wherein said compact image source has a vertical image height less than 3 inches.

9. The head up display system of claim 1, wherein said compact image source provides a maximum brightness of about 3000 fl.

10. The head up display system of claim 1, wherein said compact image source provides a dimmable image brightness in a range of about 2000:1.

11. The head up display system of claim 1, wherein said vehicle comprises an aircraft.

12. A head up display system for a vehicle, comprising:
a compact image source for projecting an image, said compact image source being positioned behind a dashboard of the vehicle; and;
a combiner for reflecting said projected image with optical power toward an observer for observation, said combiner being positioned so that said observer, in a line of sight, sees a visual exterior view of an outside scene through said combiner and said projected image in said combiner, wherein said combiner comprises a meniscus combiner, comprising:
a meniscus lens;
a multilayer dichroic coating formed on a first surface of said meniscus lens; and;
an anti-reflection coating formed on a second, opposite surface of said meniscus lens.

13. The head up display system of claim 12, wherein said compact image source comprises a liquid crystal display (LCD) in cooperation with a light emitting diode (LED).

14. The head up display system of claim 12, wherein said compact image source comprises:
an illumination system, comprising:
a light emitting diode (LED) array assembly;
a Fresnel lens array operatively associated with said LED array assembly for receiving light produced by said LED and providing a nearly collimated light output; and,
a spatial light modulator for receiving said nearly collimated light output, said spatial light modulator comprising an LCD.

15. The head up display system of claim 12, wherein said compact image source comprises:
an illumination system, comprising:
a light emitting diode (LED) array assembly; and
a Fresnel leans array operatively associated with said LED assembly for receiving light produced by said LED and providing a nearly collimated light output; and,
a spatial light modulator for receiving said nearly collimated light output, said spatial light modulator comprising an LCD, said LCD comprising an active matrix liquid crystal display (AMLCD).

16. A head up display system for a vehicle, comprising:
a compact image source for projecting an image, said compact image source, comprising and illumination system, comprising:
  i. a light emitting diode (LED) array assembly;
  ii. a Fresnel lens array operatively associated with said LED array assembly for receiving light produced by said LED and providing a nearly collimated light output; and,
  iii. a spatial light modulator for receiving said nearly collimated light output, said spatial light modulator comprising an LCD; and,
a combiner for reflecting said projected image with optical power toward an observer for observation, said combiner being positioned so that said observer, in a line of sight, sees a visual exterior view of an outside scene through said combiner and said projected image in said combiner, said combiner, comprising a meniscus combiner, comprising:
a meniscus lens;
a multi-layer dichoric coating formed on a first surface of said meniscus lens; and,
an antireflection coating formed on a second, opposite surface of said meniscus lens.

17. The head up display system of claim 16, wherein said vehicle comprises an aircraft.

* * * * *